Jan. 1, 1952  I. ROPP ET AL  2,580,959
FLYING SAW
Filed July 19, 1947  3 Sheets-Sheet 1

Inventor
IRWIN ROPP
WILBERT S. BLACKSTONE

By Francis J. Klempay
Attorney

Jan. 1, 1952      I. ROPP ET AL      2,580,959

FLYING SAW

Filed July 19, 1947      3 Sheets-Sheet 2

Inventor
IRWIN ROPP
WILBERT S. BLACKSTONE

By Francis J. Klempay
Attorney

Jan. 1, 1952     I. ROPP ET AL     2,580,959
FLYING SAW

Filed July 19, 1947     3 Sheets-Sheet 3

Inventor
IRWIN ROPP
WILBERT S. BLACKSTONE

By Francis J. Klempay
Attorney

Patented Jan. 1, 1952

2,580,959

UNITED STATES PATENT OFFICE 2,580,959

FLYING SAW

Irwin Ropp, New Bedford, Pa., and Wilbert S. Blackstone, Youngstown, Ohio

Application July 19, 1947, Serial No. 762,050

17 Claims. (Cl. 29—69)

This invention relates to apparatus for severing longitudinally advancing sections such as bars, tubes and rods into substantially predetermined lengths in a substantially continuous manner and without interference with the forward travel of the stock being cut. The provision of practical apparatus for this purpose presents a number of problems, the complexities of which are increased with greater stock speeds, and foremost among these problems are the correlation of the rectilinear component of movement of the severing mechanism employed with the forward movement of the stock and the correlation of the extent of movement of the stock with respect to the movement of the severing mechanism intermediate the severing phases of succeeding cycles of operation whereby the lengths of the cut-off pieces may be uniform and accurately predetermined. Another of the major problems encountered in the design and operation of automatic flying cut-off machines is the avoidance of excessive shock and vibration encountered in oscillating the cut-off mechanism in making successive severances in the stock. Of course, the severing mechanism must advance synchronously with the stock for a sufficient length of time during each cycle of operation to effect the cutting through of the stock and must immediately thereafter be returned to its initial starting position preparaory to again engaging the stock for making the next successive severance.

Various machine arrangements have heretofore been proposed to effect a mode of operation which satisfies all of the above outlined requirements and it might be mentioned that the most common of these comprises a reciprocating carriage on which is mounted suitable severing mechanism as a motor driven saw, for example, and which is provided with suitable moving means operative at predetermined times to advance the carriage synchronously along with the stock and to simultaneously sever the stock as by dipping the saw into and out of the stock. In apparatus of this nature, however, it is extremely difficult to oscillate the carriage rapidly back and forth as is required when cutting relatively short lengths from rapidly moving stock without excessive shock and vibration and it is almost impossible to maintain any reasonable control over the lengths of the stock pieces cut off and to accurately synchronize the rate of advancement of the carriage with the rate of advancement of the stock. In other systems and machines proposed for the subject purpose gyratory carriers for the saws have been proposed to return the saws to retarded positions preparatory to making additional cuts with a minimum of shock and vibration, but as such gyratory carriers provide predominant circular motion while the stock pieces have pure rectilinear motion the provision of adequate movement compensating arrangements presents insurmountable difficulties for all practical purposes.

It is accordingly the primary object of the invention to provide an improved form of carrier for the severing mechanism of a flying cut-off whereby the severing mechanism may have smooth rapid forward and reverse movement parallel with the line of advancement of the stock with substantially reduced shock and vibration whereby the dependability of the machine is assured. A further object of the invention is the provision in a flying cut-off of an improved arrangement for causing the severing device to move into the stock as the carrier for the severing device moves in a direction substantially parallel with the line of travel of the stock.

The above objects are accomplished, in accordance with the teachings of the present invention, primarily through the use of a supporting and moving assembly for the severing device carrier which causes the carrier to move about an oval-shaped orbit having at least one rectilinear reach substantially parallel with the direction of movement of the stock so that the severing may take place as the carrier traverses this reach. As an added feature useful when a motor driven saw is employed the axis of this reach may be angularly related to the direction of advancement of the stock only sufficient to cause the saw to move through the stock during the traverse of the carrier along this reach. Due to the rectilinear movement correlation possible in this arangement the translational speed of the severing mechanism may be accurately synchronized with the movement of the stock and because the carrier is moved into and out of its straight path of travel in the described reach along wide sweeping curves shock and vibration due to the inertia of the heavy moving parts is reduced to a minimum.

Another object of the invention is the provision in an automatic flying cut-off assembly of a simplified and improved arrangement for controlling the lengths of the stock pieces severed and for continuously monitoring the dimensions of such lengths to continuously inject a corrective factor in the operation of a cut-off machine to insure that the lengths are kept within narrow limits of predetermined values.

Yet another object of the invention is the provision of stock supporting and moving means in a flying cut-off assembly whereby improved synchronization and timing of the severing mechanism with respect to the stock may be attained to thereby assure greater dependability and accuracy in the operation of the assembly.

The above and other objects and advantages of the invention will become apparent upon consideration of the following detailed specification and the accompanying drawing wherein there is disclosed a preferred embodiment of the invention.

Figures 1, 6:
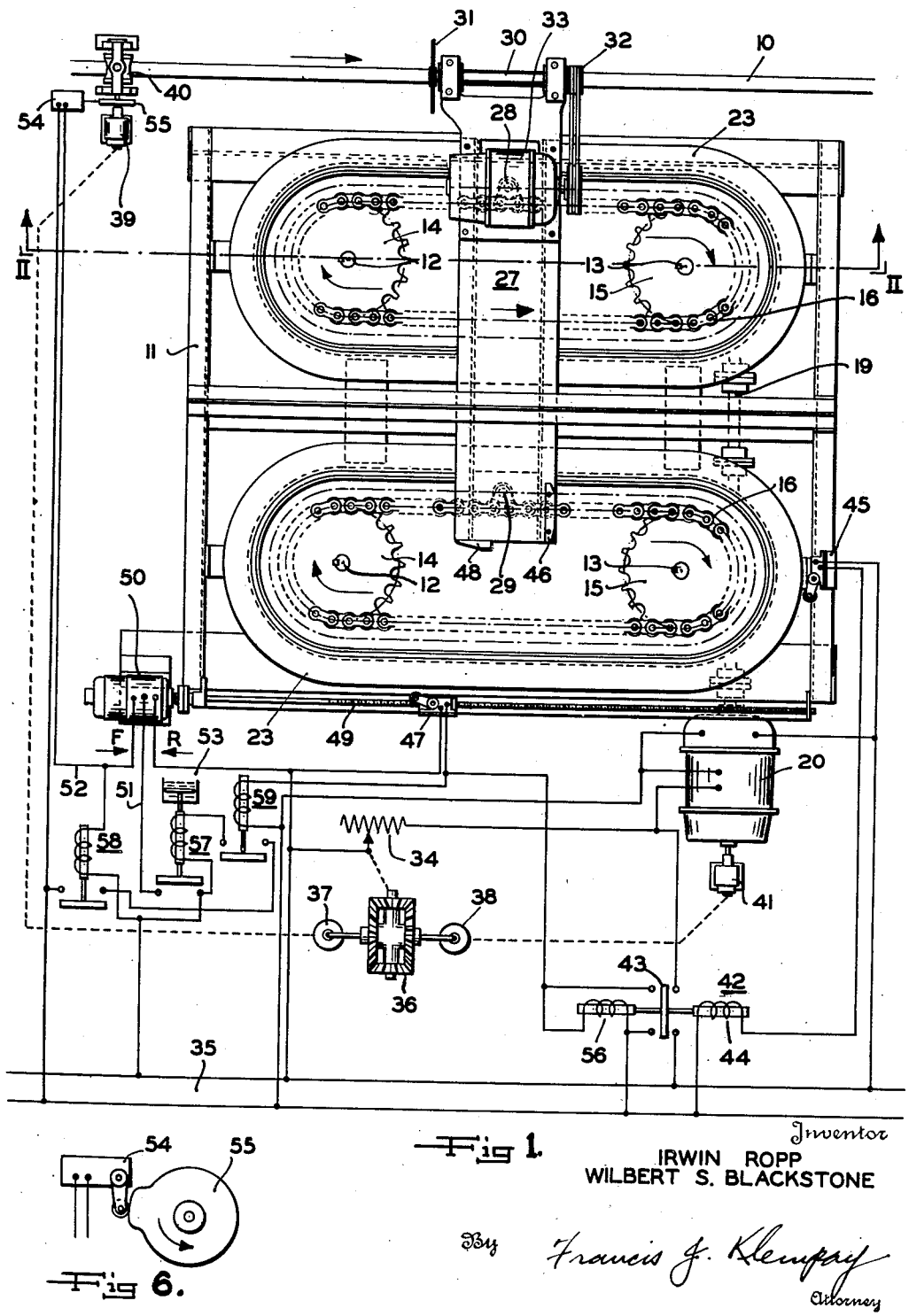
Figure 1 is a plan view of a flying saw constructed in accordance with the principles of our invention, the view also showing by way of schematic representation our improved control system.
Figure 6 is a detailed view of one of the component parts of the assembly of Figure 1.
Figure 2:
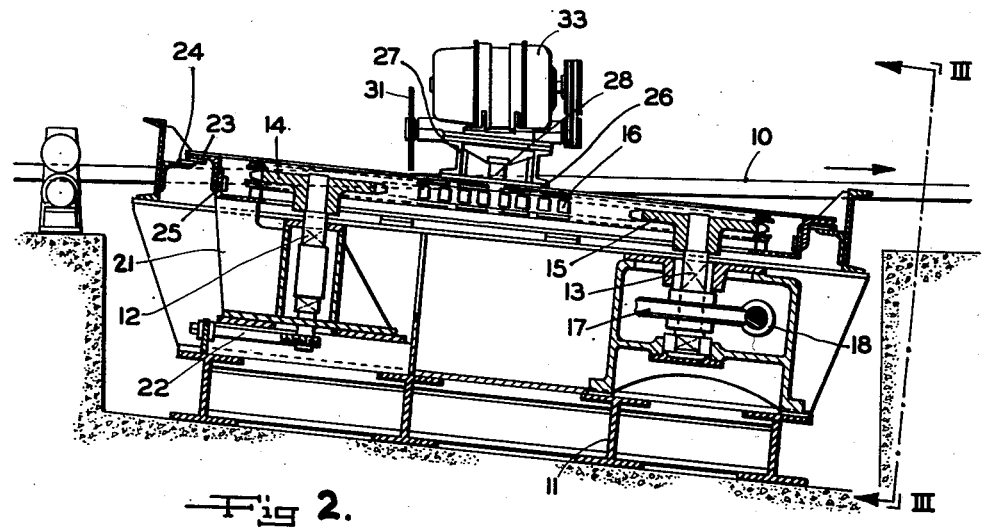
Figure 2 is a vertical section taken along the line II—II of Figure 1.
Figure 3:
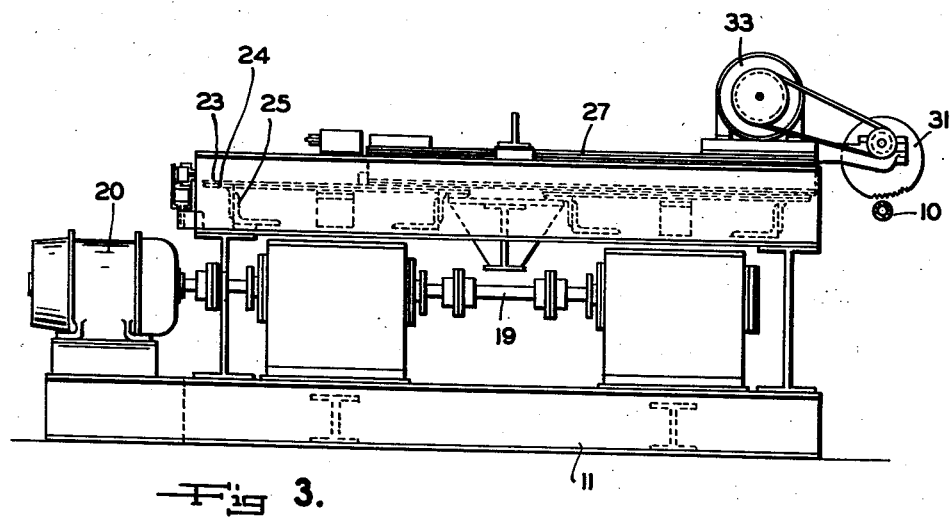
Figure 3 is an end elevation of the apparatus of Figure 1.

Referring to the drawing in detail, reference numeral 10 designates continuous pipe stock which is travelling longitudinally in the direction shown by the arrows as it issues from a continuous butt weld mill or an electric weld mill, for example. We may assume that the path of travel of the stock is generally horizontal and that suitable roll tables, not shown in Figures 1, 2 and 3, are employed to support and guide the stock. The apparatus of our invention, in its illustrated embodiment, comprises a rigid structural steel framework designated in its entirety by the reference numeral 11 and, as shown more clearly in Figures 2 and 3, this frame assembly is installed horizontally in a direction transverse to the path of travel of the stock, but in a slight downwardly inclined position in a direction parallel with the path of travel of the stock 10. Journaled in the frame 11 are two spaced parallel pairs of shafts 12 and 13 which are disposed for rotation about parallel axes extending normal to the principal plane of the frame structure. To the upper end of each of the shafts 12 is keyed a sprocket 14 and a similar sprocket 15 is keyed to the upper end of each of the shafts 13. An endless roller chain 16 is entrained about each of the pairs of sprockets 14, 15 and because of the parallelism of the two pairs of sprockets and of their being of uniform diameter the two chains 16 will have paths of travel including two parallel rectilinear reaches of one direction and two parallel rectilinear reaches of the opposite direction.

A worm gear 17, enclosed in a suitable housing, is keyed to each of the shafts 13 and meshing therewith is a worm 18. The two worms thus provided are in axial alignment with each other on the same sides of the worm gear 17 as viewed in plan and are coupled together by a shaft 19 in which is incorporated suitable flexible couplings as shown. The worms 18 are driven in unison by an electric motor 20 which is preferably of the direct current shunt-wound type and it should be obvious that upon energization of the motor 20 the two chain loops 16 will be driven at equal speeds and in the same direction. The direction of travel of the chains is shown by the arrows in Figure 1. To provide for the keeping of the chains in taut condition we preferably journal the shafts 12 in a carrier 21 which is guided and slideably mounted for movement toward and away from the shafts 13 and which is provided with one or more take-up screws as shown at 22.

Encompassing the orbit of each of the chains is a flat supporting plate or flange 23 which is assembled, preferably by welding, on suitable supporting structure comprised of the angle sections 24 and 25. The upper surface of both of the flanges 23 is made to lie accurately in a common plane for a purpose to be now described.

Resting on the flanges 23 is the bottom flat plate 26 of a beam structure 27 which beam structure is pivotally connected to the chain 16 at the two spaced points 28 and 29. These pivotal connections may be made by providing a pair of depending pins on the beam structure 27 which are rotatably received in apertures formed in brackets which are rigidly carried by the chains 16 and which are positioned on the outer periphery thereof so as not to impede the passage of the chains over the sprockets 14 and 15. As shown in Figure 1 the two chains are so oriented with respect to each other that the beam 27 is parallel with the plane passing through the axes of the two shafts 15, and it will be apparent upon an examination of Figure 1 that this parallelism will be maintained for all positions of the beam 27 which beam, of course, moves about an orbital path with a gyratory motion upon energization of the motor 20.

Journaled in the outer end of the beam 27 and extending normal to the principal axis of the beam is a shaft 30 which mounts a saw blade 31 at one end and a pulley 32 at its other end. For driving the saw we provide a motor 33 which is mounted on the beam 27 and which is coupled with the pulley 32 by the V belts shown. By referring to Figures 2 and 4 it will be observed that while the plane of the upper surface of the flanges 23 is tilted downwardly in the direction of travel of the stock 10 the shaft 30 and the motor 33 are mounted with their axes horizontal so that the saw will effect a square cut in the stock as it moves through the stock during forward movement of the carrier beam 27. The penetration of the saw into the stock is accomplished, of course, by the downward component of movement of the saw as the carrier 27 moves down the inclined plane of the surfaces 23 during forward motion of the carrier along with the stock. It should be particularly observed that as the carrier moves about its orbit the saw 31 will be positioned above the stock 10 as the carrier moves about the left curve of its orbit, as viewed in Figure 1, and that by the time the saw glides downwardly into engagement with the stock the carrier and saw axis will have pure rectilinear movement. Because of this it is possible to effect quite accurate synchronization of the longitudinal advancement of the saw with the rate of advance of the stock particularly during the actual cutting operation and in this manner an accurate cut may be effected and the saw is subjected to a minimum of distortion and deflection.

The apparatus above described is so controlled that the rate of longitudinal advancement of the saw is always precisely synchronized with the rate of longitudinal advancement of the stock during the traverse of the carrier 27 along that reach of its orbit in which the cutting is effected. In Figure 1 the carrier 27 is shown as traversing this reach. This control may be accomplished in many different ways but for illustration purposes we have shown the same as being accomplished by varying the strength of the field in the motor 20 through the use of a variable resistance 34 positioned in the energizing circuit for the field winding of the motor 20. Reference numeral 35 designates a suitable source of direct current potential for the operation and control of the apparatus illustrated. The value of resistance 34 is determined by the operation of a differential mechanism shown schematically at 36 and a having a motor 37 for driving one of its reference shafts while a motor 38 drives the other of its reference shafts. Now if the motors 37 and 38 rotate at the same speed the value of resistance 34 remains fixed while if motor 38, for example, speeds up the resistance 34 will be decreased to slow down the speed of the motor 20. Motor 37 is arranged to be energized by the output of a generator 39 which is driven by a roll 40 having driving contact with the stock 10 as it advances into the cut-off area. The motor 38 is arranged to be energized by a generator 41 which is driven by the shaft of the motor 20 preferably through a gear reduction unit, not shown, and the generator-motor sets 39, 37 and 41, 38 are each of the type which cause the speed of rotation of the shaft of the motor to vary precisely with variations in the speed of rotation of the shaft of the connected generator. Through the suitable selection of driving gear ratios and of the diameter for the roll 40 it is readily possible to secure an accurate synchronization of the longitudinally forward travel of the carrier 27 with the forward travel of the stock 10.

If the control were limited to that described above it would only be possible to cut off stock pieces having a length exactly equal to the length of either of the chains 16. In most cases it is desirable to cut off stock pieces of greater and varying lengths and to accomplish this we may provide suitable means to slow down the speed of travel of the chains during predetermined portions of their cycles of movement when the carrier 27 is being returned to its initial starting position and the saw is free and away from the stock. This control may also be accomplished in a number of different ways, but for illustration purposes we have shown it as comprising a double-acting relay 42 having a contactor 43 which in one of its two positions (to the right as viewed in Figure 1) is operative to short out the resistance 34 to connect the field winding of motor 20 directly across the line to abruptly effect a large reduction in the speed of the motor 20. To move the contactor to this position relay 42 is provided with an operating coil 44 which is energized by a limit switch 45 positioned for engagement by an operator 46 on the beam 27 as the beam rounds the far curve of its path of travel in beginning its return movement. The parts are so positioned, however, that the saw blade 31 is clear of the path of travel of the stock before the switch 45 is closed. To determine the length of time in each cycle that the motor 20 is operated at reduced speed and thus to determine the length of the stock pieces being cut off we provide a second limit switch 47 which has an operator engageable by a member 48 mounted on the carrier 27 and which is arranged to be moved back and forth to adjusted position by a lead screw 49. The latter is rotated by a reversing motor 50 having two directional windings, one connected with leads 51 and 52 for moving the position of the switch 47 to the right as viewed in Figure 1, and the other having energizing leads 51 and 53 for moving the switch 47 to the left. As shown, the common lead 51 is connected to one conductor of the source 35 while the lead 52 is connected to the other conductor of the source through a switch 54 operated by a measuring cam 55 coupled with the roll 40. The energizing lead 53 is connected with the said other conductor of said source through switch 47 and an operating coil 56 of the relay 42, which operating coil is shunted by a pair of contacts arranged to be closed by the contactor 43 upon energization of the coil 56 at the closing of the switch 47 by the member 48. The lofts of the cam 55 and member 48 are sufficient in length or extent to provide appreciable time periods of energization of the forward and reverse windings of the motor 50. These energizing periods are utilized to inch the switch 47 in a forward or reverse corrective direction so as to insure a complete cycle of operation of the cut-off machine while a predetermined length of pipe moves past the saw 31. In this manner a corrective factor is continuously applied during the normal operation of the apparatus to insure that the stock pieces being cut off are each of predetermined length. Thus it will be observed that if during a cycle of operation an insufficient length of stock has passed the roll 40 (and switch 54 remains open) before the member 48 closes the switch 47 the motor 50 will be energized in a reverse direction to move the switch 47 to the left for a period of time determined by the length of the loft on the cam member 48. This will have the overall effect of extending the length of slow speed travel of the carrier 27 so that in the succeeding cycles of operation more stock will pass under the roll 40 during each complete cycle of operation of the cut-off machine. Eventually the elapsed time of a cycle of operation of the machine will be sufficient to allow the proper length of stock to be advanced and at this time the switches 47 and 54 will be closed simultaneously and the motor 50 will be held immovably balanced whereby there is no corrective adjustment imparted to the switch 47. To prevent the trailing end of the loft of the last cam (48 or 55) to reach its switch from nullifying the corrective movement initially imparted to the switch 47 we may provide a time delay relay 57 the principal contacts of which are normally closed and are in the conductor 51. The operating coil for the relay 57 is in a series circuit across the line 35 and including the contacts of relays 58 and 59. As shown the relay 58 is energized when switch 54 is closed and relay 59 is energized only when switch 47 is closed. Thus both the switches 47 and 54 must be closed to energize the relay 57 and when the relay is energized the conductor 54 is broken and remains broken for a sufficient period of time to hold the motor 50 completely deenergized until the loss of both the cams 48 and 55 have passed the switches 47 and 54 respectively. After the relay 57 times out its period the circuit in conductor 51 is reestablished and the system is conditioned for corrective actuation in either direction during the next succeeding cycle of operation.

Figure 4:
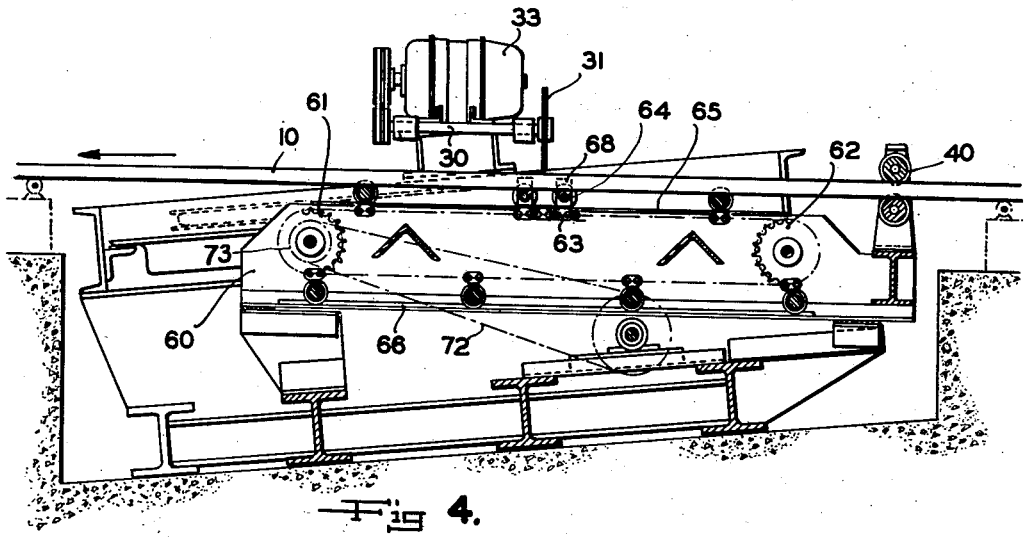
Figure 4 is a vertical section through a stock supporting and moving mechanism which may be advantageously employed with the apparatus of Figure 1.
Figure 5:
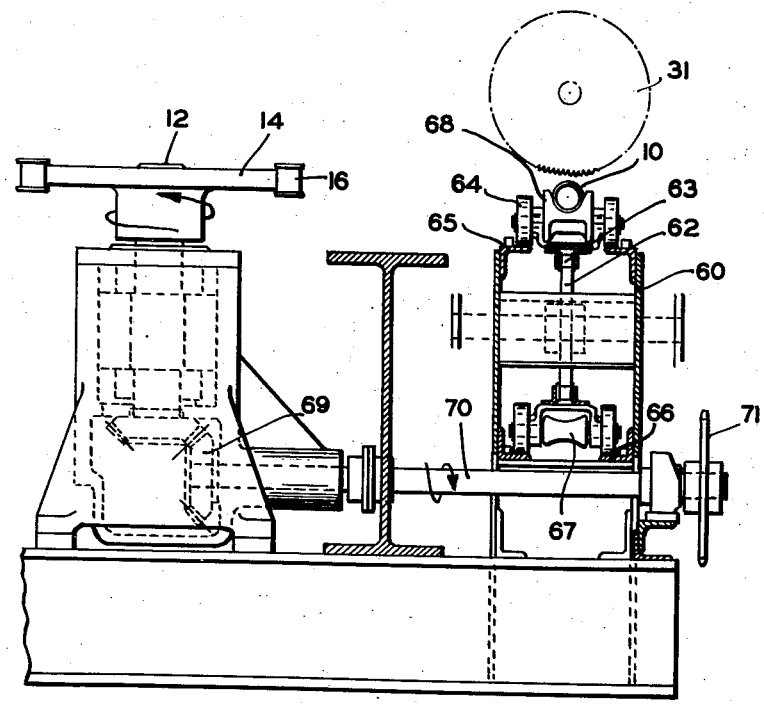
Figure 5 is a fragmentary vertical section through the assembled stock moving and supporting device and the flying cut-off apparatus of the invention.

To support the stock closely adjacent and opposite the saw during the cutting operation we may provide the movable stock supporting assembly shown in Figures 4 and 5 which consists primarily of a horizontally disposed frame structure 60 which is of elongated nature and positioned parallel below the path of travel of the stock past the cut-off machine. Journaled in opposite ends of the frame 60 is a pair of longitudinally aligned and vertically disposed sprockets 61 and 62 about which is entrained an endless chain 63. Rigidly carried by the outer periphery of the chain 63 are a series of wheeled dollies 64 which during their travel about their orbit travel on upper tracks 65 and lower tracks 66. Certain of these dollies have a freely rotating grooved roll 67 journaled on their shafts while two of these dollies are more closely spaced and have wedge blocks 68 to support the stock. The chain 63 is arranged to be driven synchronously with the chain 16 of the cut-off mechanism through the medium of a set of bevel gears 69 connected with the adjacent shaft 12 of the cut-off machine, shaft 70, sprocket 71, and chain 72 which is entrained over a sprocket 73 which is keyed to the same shaft as is the sprocket 61. As shown in Figure 4, the two dollies 64 carrying the blocks 68 are so positioned on the chain that they are always closely adjacent to but on opposite sides of the plane of the saw 31 when the saw makes its cutting stroke. Since the longitudinal travel of the saw during this stroke is accurately synchronized with the forward movement of the stock there is no sliding movement between the stock and the blocks 68 and as a consequence the blocks are most effective in supporting the stock opposite the saw and in resisting the tendency of the saw to twist or rotate the stock. The rolls 67 permit the stock to roll freely on the supporting assembly herein described when the blocks 68 are out of contact with the stock as is the case when the chains 16 are slowed down out of synchronism with the stock to allow a greater length of stock to pass before it is cut off, all as described above in connection with the statement of operation of the cut-off machine.

It should now be apparent that we have provided an improved flying cut-off apparatus which accomplishes the objects initially set out. First and foremost, the nature of the orbit of travel of the severing mechanism carrier is such that the deceleration of the carrier at the ends of its rectilinear reaches of movement is accomplished progressively in a manner analogous to simple harmonic motion and as such the shock and vibration normally attendant reciprocating machines is largely eliminated. By providing a rectilinear reach in the orbit of travel of the severing mechanism carrier which has a principal component parallel with the movement of the stock to be cut it is readily possible to secure precise synchronization of the longitudinal travel of the severing mechanism with the advancing stock. We also consider that the inclining of the plane of movement of the severing mechanism carrier is an important and most advantageous feature of our invention since it provides an exceedingly simple and dependable method for effecting movement of the severing mechanism into contact with the stock and into penetrating relation therewith after the severing mechanism has been brought into longitudinal synchronization with the stock.

By reason of the fact that the pins 28 and 29 are outside of the paths of movement of the chains entrained over the two sets of sprockets 14, 15 the rectilinear component of movement of the carrier 27 in a direction parallel with the stock will be accelerated as the common plane of the axes of the pins 28 and 29 passes through the common plane of the axes of the two shafts 13 because at this time there is added to the normal rectilinear movement of the carrier 27 a further component which is the result of the longer arcs of travel of the axes of the pins 28 and 29 as compared to the arc of travel of the pitch diameter of the sprockets 15 for any given angular movement of the sprockets 15. This operating characteristic is most advantageous in that it causes the saw blade 31 to lead away from the advancing end of the stock 10 after a severing cut has been made and at the time the saw is withdrawing laterally from the advancing unsevered stock.

It should also now be apparent that the control system for flying cut-offs which we have herein proposed also accomplishes certain objects of the invention initially set out. First, we have provided simple and dependable instrumentation for effecting the required coordination of the movement of the severing mechanism with the stock during the severing phase of the complete cycle of operation of the assembly and, secondly, we have provided an improved and simplified arrangement for varying the length of the stock pieces being cut off and of more importance for the continuous monitoring of these stock lengths for the obtaining of responsive impulses employed for injecting a corrective factor, if required, in the control at each cycle of operation whereby the stock pieces cut off will be of high dimensional uniformity. To vary the lengths of the stock pieces cut off it is of course necessary only to vary the ratio of the drive between the measuring roll 40 and the control actuating cam 55 as will be readily understood.

The above described embodiment of our invention should be considered as illustrative only as obviously many changes may be made therein without departing from the spirit or scope of the invention. Since many changes may be made therein we do not desire to be limited to the specific structures and instrumentalities illustrated in the drawing and specifically described above, and reference should therefore be had to the appended claims in determining the scope of the invention.

What we claim is:

1. In apparatus for severing predetermined lengths from continuous stock advancing in a longitudinal direction along a predetermined path comprising in combination a cut-off device, a carrier for said device extending in a lateral direction with respect to the direction of movement of the stock, means supporting said carrier for sliding movement in a fixed plane disposed in inclined relation to the longitudinal axis of said stock in such manner as to cause said device to move into said stock during a portion of its traverse, means to move said carrier about a gyratory path in said plane whereby the angularity of said carrier with respect to the said direction remains fixed, said last mentioned path including a rectilinear reach extending principally in a direction parallel with the direction of advancement of said stock during the traverse of which said device is operative to sever said stock.

2. In apparatus for severing predetermined lengths from continuous stock advancing longitudinally in a predetermined direction comprising in combination supporting means having a flat upper surface, a carrier slideably mounted on said surface, a motor-driven saw mounted on said carrier, means to move said carrier about said surface comprising two spaced pairs of sprockets rotatably mounted for movement in a common plane parallel with but positioned below said surface, a chain entrained over the sprockets of each pair of sprockets and having a pivotal driving interconnection with said carrier, and means to impart simultaneous and equal rotation in the same direction to the sprockets in both said pairs of sprockets.

3. Apparatus according to claim 2 further including means mounting said supporting means in such manner that said upper surface is inclined downwardly in the direction of advancement of the stock, and means mounting said saw on said carrier in a tilted position for rotation about an axis parallel with the direction of advancement of the stock whereby upon traverse of said carrier over a rectilinear reach of its gyratory path of travel said saw will move into said stock in a direction normal to the direction of advancement of said stock.

4. Apparatus according to claim 2 further characterized in that said means to simultaneously rotate said pairs of sprockets comprises a single electric motor, and further including means to continuously adjust the speed of said motor in accordance with variations in the speed of advancement of said stock.

5. In apparatus for severing predetermined lengths from continuous elongated stock advancing longitudinally in a predetermined direction the combination of a motor driven circular saw, a carrier for said saw, means mounting said carrier for movement in a plane inclined with respect to the direction of advancement of said stock and about a gyratory path in said plane having a rectilinear reach extending parallel with the vertical plane passing through the longitudinal axis of said stock, and means to move said carrier about said path, said means to move and said mounting means being operative to maintain a predetermined angular relation between said carrier and said vertical plane.

6. Apparatus according to claim 5 further including driving means to move said carrier about said path, and means to synchronize the speed of said driving means with the rate of advancement of said stock.

7. Apparatus according to claim 5 further including driving means to move said carrier about said path, means to synchronize the speed of said driving means with the rate of advancement of said stock, and means operative upon said carrier reaching successive positions along its path of travel to first reduce the speed of said driving means and to thereafter restore the normal speed of said driving means.

8. Apparatus according to claim 7 further including means to shift the said position which restores the normal speed to said driving means automatically in response to variations in the length of stock advanced in each succeeding cycle of operation of the apparatus.

9. Apparatus according to claim 5 further including an electric motor for moving said carrier around its path, means to normally synchronize the speed of said motor with the rate of advancement of the stock, a first limit switch operable upon said carrier reaching a predetermined position along its path to change the speed of said motor from its normal synchronized speed, and a second limit switch operable upon said carrier reaching a more advanced position along its path of travel to restore the normal synchronized speed to said motor.

10. Apparatus according to claim 9 further including automatic means to shift said second switch back and forth along said path of travel in response to variations in the length of stock advanced in each cycle of operation.

11. In apparatus for severing predetermined lengths from continuous elongated stock advancing longitudinally in a predetermined direction comprising in combination a cut-off device, a carrier for said device, and means mounting said carrier for movement about a gyratory path having a rectilinear reach extending parallel with a plane passing through the longitudinal axis of said stock, driving means for said carrier, means normally synchronizing the speed of said driving means with the rate of advancement of the stock, a first limit switch operable upon said carrier reaching a predetermined position along its path of travel to change the speed of said driving means, and a second limit switch operable upon said carrier reaching a further advanced position along its path of travel to restore the normal synchronous speed to said driving means.

12. Apparatus according to claim 11 further including means to shift the position of said second switch back and forth along said path automatically in response to variations in the length of the stock advanced in each succeeding cycle of operation of the apparatus.

13. Apparatus according to claim 11 further including moving means to support said stock adjacent said cut-off device comprising an endless carrier driven in exact synchronism with movement of said first mentioned carrier, said endless carrier having fixed supporting means to engage portions of the stock adjacent the cut-off points and anti-friction supporting means for engaging the stock intermediate the cut-off points as the stock advances longitudinally past said apparatus.

14. In apparatus for severing lengths from continuous stock advancing longitudinally the combination of a severing device, means mounting said device for movement about a closed gyratory path having a rectilinear reach to effect in said device a component of movement of uniform speed extending generally parallel with the vertical plane through the axis of said stock and inclined with respect to the direction of travel of said stock, means to synchronize the speed of movement of said device along said reach with the speed of travel of said stock whereby the speed of said component of movement is equal to the speed of advancement of said stock, said mounting means being operative to accelerate said severing means in a leading direction with respect to said stock upon said device reaching the end of said rectilinear reach of movement.

15. In apparatus for severing lengths from continuous stock advancing longitudinally the combination of a pair of endless chains each driven and guided for movement about an oval-shaped path of travel, the paths of travel of said chains lying in the common plane and being generally parallel to each other, said plane being generally inclined with respect to the direction of travel of said stock, means to drive said chains synchronously with respect to each other, a stock severing device, a carrier for said severing device movable side and endwise in a plane generally parallel to said first mentioned plane, and a pivotal interconnection between each of said chains and said carrier, said pivotal interconnections lying outside the paths of travel of the contiguous chains.

16. Apparatus for cutting a continuous length of stock moving in a direction co-incident with the longitudinal axis of the stock comprising in combination a motor-driven circular saw, a support for said saw, a base for said support having means to guide said support for gyratory movement along a closed path lying in a fixed plane which is tilted with respect to said axis to intersect the same, driving means to move said support along its guided path of travel including means to maintain constant the orientation of said support and saw with respect to said axis, said moving means and guiding means being operative to effect a rectilinear reach in said closed path in generally parallel but inclined relation to said stock whereby during traverse of said reach by said support said saw moves into said stock while moving synchronously and rectilinearly therewith.

17. Apparatus for severing predetermined lengths from continuous elongated stock advancing in a longitudinal direction along a predetermined path comprising in combination a driven circular saw, an elongated carrier for said saw extending substantially lateral to the direction of movement of said stock, means for supporting said carrier for sliding movement in a plane inclined downwardly relative to the direction of travel of said stock whereby upon sliding movement of said carrier down said plane said saw will be moved downwardly into said stock, and means to move said carrier along a gyratory path having a rectilinear reach generally parallel with said longitudinal direction and lying in said downwardly disposed plane, said means comprising a pair of pivot pins engaging said carrier at spaced points and means to move each of said pins about identical but spaced gyratory paths lying in a plane parallel with said downwardly inclined plane.

IRWIN ROPP.
WILBERT S. BLACKSTONE.

REFERENCES CITED

The following references are of record in the file of this patent:

UNITED STATES PATENTS

| Number | Name | Date |
| --- | --- | --- |
| 1,580,809 | Brown | Apr. 13, 1926 |
| 2,120,853 | Brown et al. | June 14, 1938 |
| 2,157,067 | Brown et al. | May 2, 1939 |
| 2,332,013 | Rudert et al. | Oct. 19, 1943 |
| 2,341,870 | Johnston | Feb. 15, 1944 |
| 2,512,204 | Gould | June 20, 1950 |